(12) United States Patent
Kwak et al.

(10) Patent No.: US 10,938,036 B2
(45) Date of Patent: Mar. 2, 2021

(54) METHOD OF PREPARING POSITIVE ELECTRODE MATERIAL FOR LITHIUM SECONDARY BATTERY, POSITIVE ELECTRODE MATERIAL FOR LITHIUM SECONDARY BATTERY, AND LITHIUM SECONDARY BATTERY INCLUDING THE POSITIVE ELECTRODE MATERIAL

(71) Applicant: LG Chem, Ltd., Seoul (KR)

(72) Inventors: Ick Soon Kwak, Daejeon (KR); Seung Beom Cho, Daejeon (KR); Yeo June Yoon, Daejeon (KR); Sung Wook Mhin, Daejeon (KR)

(73) Assignee: LG Chem, Ltd.

( * ) Notice: Subject to any disclaimer, the term of this patent is extended or adjusted under 35 U.S.C. 154(b) by 823 days.

(21) Appl. No.: 14/907,990

(22) PCT Filed: Sep. 10, 2015

(86) PCT No.: PCT/KR2015/009540
§ 371 (c)(1),
(2) Date: Jan. 27, 2016

(87) PCT Pub. No.: WO2016/039574
PCT Pub. Date: Mar. 17, 2016

(65) Prior Publication Data
US 2016/0254546 A1    Sep. 1, 2016

(30) Foreign Application Priority Data

Sep. 12, 2014    (KR) .................. 10-2014-0121355
Sep. 10, 2015    (KR) .................. 10-2015-0128135

(51) Int. Cl.
*H01M 4/62*    (2006.01)
*H01M 4/505*    (2010.01)
(Continued)

(52) U.S. Cl.
CPC ......... *H01M 4/628* (2013.01); *B01J 13/0047* (2013.01); *H01M 4/0402* (2013.01);
(Continued)

(58) Field of Classification Search
None
See application file for complete search history.

(56) References Cited

U.S. PATENT DOCUMENTS

2001/0046628 A1* 11/2001 Oesten ............... C01G 45/1242
                                                        429/231.1
2003/0138697 A1*  7/2003 Leising ................. H01M 4/366
                                                        429/231.1
(Continued)

FOREIGN PATENT DOCUMENTS

CN    101359733 A  *  2/2009
CN    103496724 A  *  1/2014
(Continued)

OTHER PUBLICATIONS

Kim et al., The Electrochemical Stability of Spinel Electrodes Coated with ZrO2, Al2O3, and SiO2 from Colloidal Suspensions, Journal of the Electrochemical Society, 151, 10, A1755-A1761, 2004, doi: 10.1149/1.1793713 (Year: 2004).*
(Continued)

*Primary Examiner* — Ula C Ruddock
*Assistant Examiner* — Anna Korovina
(74) *Attorney, Agent, or Firm* — Lerner, David, Littenberg, Krumholz & Mentlik, LLP

(57) ABSTRACT

The present invention relates to a method of preparing a positive electrode material for a lithium secondary battery including a first step of synthesizing a lithium transition metal oxide represented by Chemical Formula 1, a second step of preparing lithium transition metal oxide powder by grinding the lithium transition metal oxide, a third step of
(Continued)

preparing a positive electrode material including an alumina coating layer by mixing as well as dispersing the lithium transition metal oxide powder in an alumina nanosol, and a fourth step of drying the positive electrode material, a positive electrode material for a lithium secondary battery prepared by the above method, and a lithium secondary battery including the positive electrode material,

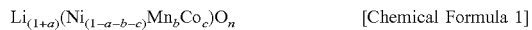

[Chemical Formula 1]

where $0 \leq a \leq 0.1$, $0 \leq b \leq 1$, $0 < c \leq 1$, and n is an integer of 2 or 4.

5 Claims, 7 Drawing Sheets

(51) Int. Cl.
| | |
|---|---|
| *H01M 4/525* | (2010.01) |
| *H01M 4/04* | (2006.01) |
| *B01J 13/00* | (2006.01) |
| *H01M 4/131* | (2010.01) |
| *H01M 4/38* | (2006.01) |
| *H01M 10/0525* | (2010.01) |
| *H01M 10/0568* | (2010.01) |
| *H01M 10/0569* | (2010.01) |
| *H01M 4/02* | (2006.01) |
| *H01M 4/1391* | (2010.01) |
| *H01M 4/66* | (2006.01) |
| *H01M 10/0585* | (2010.01) |

(52) U.S. Cl.
CPC ....... *H01M 4/0419* (2013.01); *H01M 4/0471* (2013.01); *H01M 4/131* (2013.01); *H01M 4/382* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 4/0404* (2013.01); *H01M 4/1391* (2013.01); *H01M 4/661* (2013.01); *H01M 10/0585* (2013.01); *H01M 2004/021* (2013.01); *H01M 2004/027* (2013.01); *H01M 2004/028* (2013.01); *H01M 2220/30* (2013.01); *H01M 2300/0028* (2013.01); *Y02T 10/70* (2013.01)

(56) References Cited

U.S. PATENT DOCUMENTS

| | | | |
|---|---|---|---|
| 2006/0068289 | A1 | 3/2006 | Paulsen et al. |
| 2006/0263693 | A1* | 11/2006 | Kim ............... H01M 10/0525 429/251 |
| 2008/0118840 | A1* | 5/2008 | Yew ............... B82Y 30/00 429/231.5 |
| 2010/0187471 | A1 | 7/2010 | Paulsen et al. |
| 2010/0227222 | A1 | 9/2010 | Chang et al. |
| 2010/0248034 | A1* | 9/2010 | Oki ............... H01M 4/139 429/231.8 |
| 2011/0076556 | A1 | 3/2011 | Karthikeyan et al. |
| 2011/0143209 | A1* | 6/2011 | Park ............... C01G 45/1228 429/231.95 |
| 2011/0217574 | A1 | 9/2011 | Toyama et al. |
| 2012/0058375 | A1* | 3/2012 | Tanaka ............... H01M 4/13 429/94 |
| 2012/0282522 | A1* | 11/2012 | Axelbaum ............... B82Y 30/00 429/219 |
| 2013/0071748 | A1* | 3/2013 | Okada ............... H01M 4/485 429/223 |
| 2013/0175469 | A1 | 7/2013 | Paulsen et al. |
| 2013/0189581 | A1* | 7/2013 | Imaizumi ............... C01G 23/002 429/223 |
| 2014/0110641 | A1* | 4/2014 | Murotani ............... H01M 4/485 252/519.15 |
| 2014/0162132 | A1 | 6/2014 | Ishii et al. |
| 2015/0162598 | A1 | 6/2015 | Kim et al. |
| 2015/0349339 | A1* | 12/2015 | Cho ............... H01M 4/366 429/223 |

FOREIGN PATENT DOCUMENTS

| | | |
|---|---|---|
| DE | 10234916 A1 | 2/2004 |
| DE | 102009008999 A1 | 8/2010 |
| JP | 2004039620 A | 2/2004 |
| JP | 2005078800 A | 3/2005 |
| JP | 2005276454 A | 10/2005 |
| JP | 2008514534 A | 5/2008 |
| JP | 2008130571 A | 6/2008 |
| JP | 2011187193 A | 9/2011 |
| JP | 2013206559 A | 10/2013 |
| JP | 2014096281 A | 5/2014 |
| JP | 2014116111 A | 6/2014 |
| KR | 20060051055 A | 5/2006 |
| KR | 100813014 B1 | 3/2008 |
| KR | 20120099375 A | 9/2012 |
| KR | 20130055654 A | 5/2013 |
| TW | 200736165 | 10/2007 |
| TW | 200810202 A | 2/2008 |
| WO | 2011031544 A2 | 3/2011 |
| WO | WO-2012176901 A1 * | 12/2012 ............ H01M 4/485 |
| WO | 2014021626 A1 | 2/2014 |
| WO | WO-2014104466 A1 * | 7/2014 ............ H01M 4/366 |

OTHER PUBLICATIONS

Thackeray et al., Synthesis and electrochemical characteristics of Al2O3-coated LiNi1/3Co1/3Mn1/3O2 cathode materials for lithium ion batteries, Electrochimica Acta 52 (2006) 1316-1322, doi:10.1016/j.electacta.2006.07.033 (Year: 2006).*
Sono Tek Spray NPL May 2013, http://www.sono-tek.com/fuel-cell-catalyst-coating-overview/ (Year: 2013).*
Youn-Han Chang et al., Translation of "Analyses on the Physical and Electrochemical Properties of Al2O3 Coated LiCoO2", Journal of the Korean Electrochemical Society, vol. 10, No. 3, 2007, 184-189. (Year: 2007).*
Hui et al., CN 103496724A Machine Translation (Year: 2014).*
Chen et al., "Improve the structure and electrochemical performance of LiNi0.6Co0.2Mn cathode material by nano-Al2O3 ultrasonic coating", Journal of Alloys and Compounds, vol. 611, 2014, 135-141. (Year: 2014).*
Jiang et al., CN 101359733 Machine Translation. (Year: 2009).*
Extended Search Report from European Application No. 15826011.7, dated Aug. 2, 2016.
S. Verdier, et al., XPS Study on Al2O3- and AlPO4-Coated LiCoO2 Cathode Material for High-Capacity Li Ion Batteries, Journal of the Electrochemical Society, vol. 154, No. 12, Oct. 8, 2007, pp. 1088-1099.
Taiwanese Search Report for Application No. 104130136 dated Jun. 20, 2016.
Kim, Youngsik, et al., Synthesis and electrochemical characteristics of Al2O3-coated LiNi1/3Co1/3Mn1/3O2 cathode materials for lithium ion batteries, Electrochimica Acta 52, 2006, 1316-1322.
International Search Report for Application No. PCT/KR2015/009540 dated Jan. 8, 2016.

* cited by examiner

METHOD OF PREPARING POSITIVE ELECTRODE MATERIAL FOR LITHIUM SECONDARY BATTERY, POSITIVE ELECTRODE MATERIAL FOR LITHIUM SECONDARY BATTERY, AND LITHIUM SECONDARY BATTERY INCLUDING THE POSITIVE ELECTRODE MATERIAL

CROSS-REFERENCE TO RELATED APPLICATIONS

This application is a national phase entry under 35 U.S.C. § 371 of International Application No. PCT/KR2015/009540, filed Sep. 10, 2015, which claims priority to Korean Patent Application No. 10-2014-0121355, filed Sep. 12, 2014 and Korean Patent Application No. 10-2015-0128135, filed Sep. 10, 2015, the disclosures of which are incorporated herein by reference.

TECHNICAL FIELD

The present invention relates to a method of preparing a positive electrode material for a lithium secondary battery including a gamma alumina coating layer, a positive electrode material for a lithium secondary battery including a gamma alumina coating layer, and a lithium secondary battery including the positive electrode material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

In the preparation of the lithium secondary battery, a positive electrode and a negative electrode respectively use materials capable of reversibly intercalating and deintercalating lithium ions.

Lithium transition metal oxides, such as $LiCoO_2$, $LiMn_2O_4$, $LiNiO_2$, and $LiMnO_2$, are widely used as a positive electrode material for a lithium secondary battery. However, research into the development of novel materials for replacing these materials in terms of cost competitiveness, capacity, and cycle characteristics has emerged.

Recently, positive electrode materials, which are composed of various ternary lithium composite oxides ($Li_{1+x}(Ni_aMn_bCo_{1-a-b-x})O_2$ (where $-0.1 \leq x \leq 0.1$, $0 \leq x+a+b \leq 1$), in which a part of nickel in the $LiNiO_2$ is substituted with other transition metals (cobalt (Co) and manganese (Mn)), have been proposed. However, although the NiMnCo-based ternary positive electrode materials have excellent capacity and cycle characteristics, their stability at high temperature/high voltage may be low.

Characteristics of the positive electrode material formed of these lithium transition metal oxides may be further improved by surface modification. For example, a method of extending the lifetime of the positive electrode material by preventing degradation has been proposed in which a surface of the positive electrode material is modified by coating the surface of the positive electrode material with oxides of metals, such as aluminum (Al), magnesium (Mg), zirconium (Zr), cobalt (Co), potassium (K), sodium (Na), calcium (Ca), and titanium (Ti), fluorine-based materials, or phosphate-based materials.

Korea Patent Application Laid-Open Publication No. 10-2006-0051055 discloses a method of preparing an alumina-coated lithium transition metal oxide by using a water-based process, and Korea Patent Application Laid-Open Publication No. 10-2013-0055654 discloses a method of coating the surface of a positive electrode material with alumina using a dry coating method.

However, conventional methods have limitations in that their process is complex, manufacturing costs increase, and it is difficult to obtain uniform coating effect and low surface roughness because the surface of the positive electrode material is damaged during a dry mixing process. Thus, since effective surface modification may not be obtained, there is a need to develop a method capable of effectively modifying the surface of the positive electrode material.

PRIOR ART DOCUMENTS

Korean Patent Application Laid-Open Publication No. 10-2006-0051055
Korean Patent Application Laid-Open Publication No. 10-2013-0055654

DISCLOSURE OF THE INVENTION

Technical Problem

An aspect of the present invention provides a method of preparing a positive electrode material for a lithium secondary battery including a gamma (γ)-alumina coating layer having excellent coating performance.

Another aspect of the present invention provides the positive electrode material for a lithium secondary battery including a γ-alumina coating layer.

Another aspect of the present invention provides a positive electrode for a lithium secondary battery including the positive electrode material and a lithium secondary battery including the same.

Technical Solution

According to an aspect of the present invention, there is provided a method of preparing a positive electrode material for a lithium secondary battery including the steps of:

a first step of synthesizing a lithium transition metal oxide represented by Chemical Formula 1;

a second step of preparing lithium transition metal oxide powder by grinding the lithium transition metal oxide;

a third step of preparing a positive electrode material including an alumina coating layer by mixing as well as dispersing the lithium transition metal oxide powder in an alumina nanosol; and a fourth step of drying the positive electrode material, $$Li_{(1+a)}(Ni_{(1-a-b-c)}Mn_bCo_c)O_n \qquad \text{[Chemical Formula 1]}$$

where $0 \leq a \leq 0.1$, $0 \leq b \leq 1$, $0 < c \leq 1$, and n is an integer of 2 or 4.

According to another aspect of the present invention, there is provided a positive electrode material for a secondary battery including: lithium transition metal oxide particles represented by Chemical Formula 1; and an alumina coating layer formed on surfaces of the lithium transition metal oxide particles and including a γ-alumina phase in an amount of 95% or more, wherein a coverage of the alumina coating layer is in a range of 30% to 50% based on a total surface area of the lithium transition metal oxide particles.

According to another aspect of the present invention, there is provided a lithium secondary battery including: a positive electrode; a negative electrode; a separator disposed between the positive electrode and the negative electrode; and an electrolyte solution, wherein the positive electrode includes a positive electrode material represented by Chemical Formula 2,

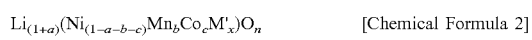

$Li_{(1+a)}(Ni_{(1-a-b-c)}Mn_bCo_cM'_x)O_n$ [Chemical Formula 2]

where $0 \leq a \leq 0.1$, $0 \leq b \leq 1$, $0 < c \leq 1$, $0 < x \leq 1$, n is an integer of 2 or 4, and M' is $Al_2O_3$ having a gamma phase.

In this case, the lithium secondary battery may have an HF content of 900 ppm or less based on a total weight of the electrolyte solution after an activation process and initial charge and discharge.

According to another aspect of the present invention, there is provided a method of preparing an alumina nanosol including: mixing alumina nanopowder and a solvent to prepare an alumina nanopowder suspension; and dispersing the suspension with a bead mill to prepare an alumina nanosol, wherein the alumina nanosol includes a γ-alumina phase in an amount of 99% of more.

Advantageous Effects

As described above, according to the present invention, a positive electrode material for a lithium secondary battery including an alumina coating layer, in which high temperature and high voltage stability, cycle characteristics, and battery lifetime are improved, and a lithium secondary battery including the positive electrode material may be prepared by forming a γ-alumina coating layer having low surface roughness and excellent coating performance on a portion of the surface of the positive electrode material using an alumina nanosol.

MODE FOR CARRYING OUT THE INVENTION

Figure 1:
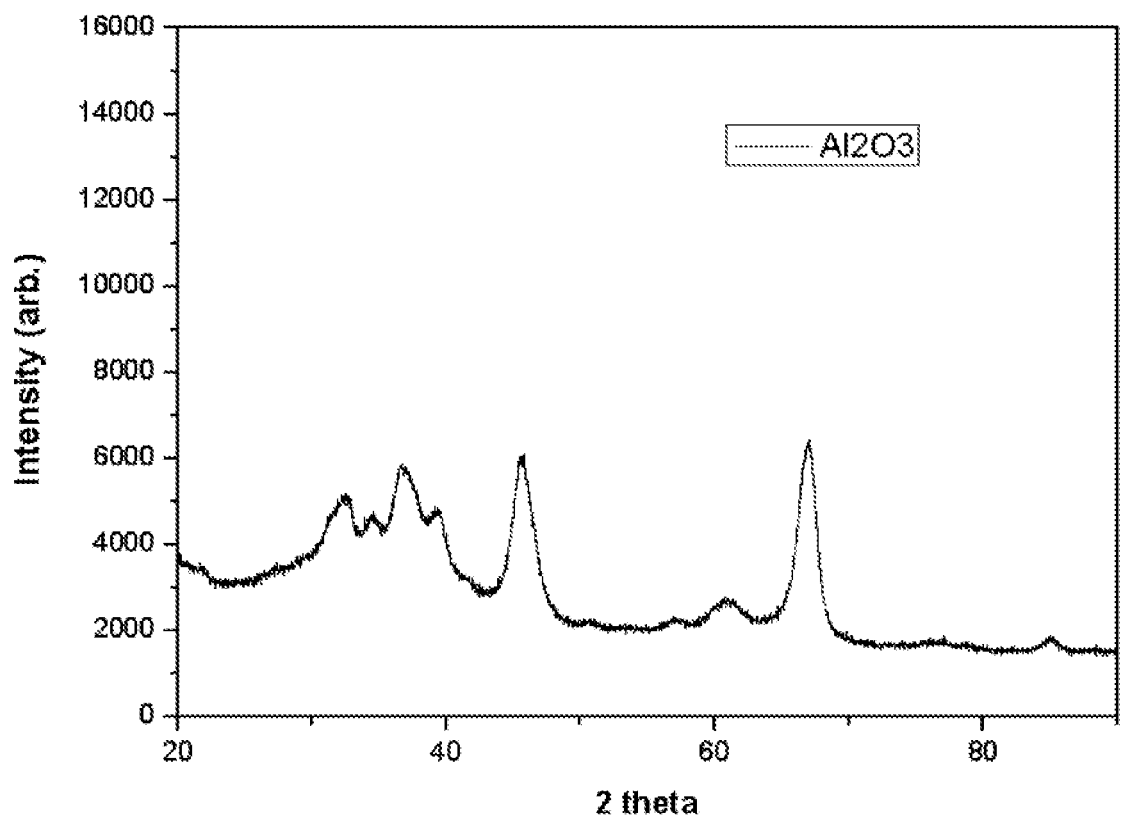
FIG. 1 is X-ray diffraction (XRD) data of a γ-alumina nanosol of Preparation Example 1.

Hereinafter, the present invention will be described in detail. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Typically, a method of preparing a positive electrode material including an alumina coating layer in the form of a film has been suggested, in which aluminum (Al) is oxidized using a solvent such as alkoxide, a predetermined amount of positive electrode material powder is put in the aluminum oxide solution and mixed, and a high-temperature sintering process is then performed in a temperature range of about 400° C. to about 600° C. However, in the case that the above-described wet mixing process is used, since the alumina coating layer in the form of a film is partially present as a boehmite phase having low crystallinity, coating performance may be low. Furthermore, the mobility of lithium ions is reduced due to the alumina coating layer present on the entire surface of the positive electrode material, and this may eventually cause capacity loss of a lithium secondary battery, reduction of battery lifetime, and an increase in the risk of accidents.

According to an embodiment of the present invention, there is provided a method of preparing a positive electrode material for a lithium secondary battery including the steps of:

a first step of synthesizing a lithium transition metal oxide represented by Chemical Formula 1;

a second step of preparing lithium transition metal oxide powder by grinding the lithium transition metal oxide;

a third step of preparing a positive electrode material including an alumina coating layer by mixing as well as dispersing the lithium transition metal oxide powder in an alumina nanosol; and a fourth step of drying the positive electrode material,

$Li_{(1+a)}(Ni_{(1-a-b-c)}Mn_bCo_c)O_n$ [Chemical Formula 1]

where $0 \leq a \leq 0.1$, $0 \leq b \leq 1$, $0 < c \leq 1$, and n is an integer of 2 or 4.

In this case, the alumina coating layer may include a γ-alumina phase in an amount of 95 wt % or more, preferably 99 wt % or more, and more preferably 100 wt % based on a total weight of the alumina coating layer.

In the method of the present invention, as a typical example, the lithium transition metal oxide may be $Li[Ni_{0.5}Mn_{1.5-x}Co_x]O_4$ ($0 \leq x \leq 0.1$), $Li(Ni_{0.6}Mn_{0.2}Co_{0.2}O_2)$, $Li(Ni_{0.8}Mn_{0.1}Co_{0.1}O_2)$, $Li(Ni_{0.5}Mn_{0.3}Co_{0.2}O_2)$, $Li(Ni_{1/3}Mn_{1/3}Co_{1/3}O_2)$, or $LiCoO_2$.

Also, in addition to the lithium transition metal oxide represented by Chemical Formula 1, the lithium transition metal oxide may include lithium transition metal oxides for a positive electrode material typically used in the art, specifically, ternary lithium transition metal oxides such as $LiNi_{1-x-y-z}Co_xM1_yM2_zO_2$ (where M1 and M2 are each independently any one selected from the group consisting of aluminum (Al), nickel (Ni), cobalt (Co), iron (Fe), manganese (Mn), vanadium (V), chromium (Cr), titanium (Ti), tungsten (W), tantalum (Ta), magnesium (Mg), and molybdenum (Mo), and x, y, and z are each independently an atomic fraction of oxide-forming elements, in which $0 \leq x < 0.5$, $0 \leq y < 0.5$, $0 \leq z < 0.5$, and $x+y+z \leq 1$), and a single material selected from the group consisting of $LiNiO_2$ (LNO), $LiMnO_2$ (LMO), and $LiMn_2O_4$, or a mixture of two or more thereof. The first step of synthesizing a lithium transition metal oxide may be performed by mixing a lithium precursor and other transition metal precursors in a mixer and then sintering the mixture. In this case, the mixing and sintering may be performed in a temperature range of 1,000° C. to 1,100° C. for about 6 hours to about 12 hours, specifically, 10 hours.

Also, according to the method of the present invention, in the second step, lithium transition metal oxide powder having a particle diameter of about 10 μm to about 30 μm, specifically, 18 μm, may be prepared by grinding the lithium transition metal oxide obtained in the first step. In the case that the particle diameter of the lithium transition metal oxide powder obtained in the second step is greater than 30 μm, surface resistance may be increased. In the case in which the particle diameter is less than 10 μm, a specific surface area may be increased, and thus, this may eventually cause the reduction of initial capacity and cycles in a subsequent process.

Also, in the method of the present invention, the dispersion process of the lithium transition metal oxide powder in the third step may be performed using a stirring mixer at a speed of 300 rpm.

In the third step, the lithium transition metal oxide powder and the alumina nanosol may be mixed at a weight ratio of 1:80 to 1:100. In the case that the mixing ratio of the alumina nanosol is less than 80 as a weight ratio, since semi-dry mixing may be difficult to be performed, surface roughness of the alumina coating layer may increase and coating performance may degrade. In contrast, in the case in which the mixing ratio of the alumina nanosol is greater than 100 as a weight ratio, drying time may be increased and a coating process may take longer.

Also, in the third step, the lithium transition metal oxide powder may be directly dispersed in the alumina nanosol or may be dispersed after a lithium transition metal oxide powder solution is prepared by spaying the lithium transition metal oxide powder in an organic solvent.

In this case, it is desirable to use the organic solvent having a low boiling point (bp) so that the organic solvent may be easily evaporated at low temperature. Typical examples of the organic solvent may be 1-methoxy-2-propanol, ethyl alcohol, methyl alcohol, or isopropyl alcohol. The organic solvent may be used in an amount of 70 wt % to 99 wt % based on a total weight of the positive electrode material. In the case that the amount of the organic solvent is greater than 99 wt % or less than 70 wt %, coating uniformity may be reduced.

In the method of the present invention, the drying of the fourth step may be performed by performing low-temperature sintering in a temperature range of 130° C. to 350° C., specifically, 150° C. to 300° C.

Also, the method of the present invention may further include a fifth step of sintering the dried positive electrode material after the fourth step.

In this case, the sintering of the fifth step may be performed by performing high-temperature sintering in a temperature range of 400° C. to 800° C.

That is, according to the method of the present invention, a γ-alumina coating layer having low surface roughness and excellent coating performance may be formed on the surface of the positive electrode material by only performing the drying of the fourth step. Furthermore, a better coating effect of the γ-alumina coating layer may be obtained by further performing the high-temperature sintering after the drying.

The alumina nanosol used in the method of preparing a positive electrode material of the present invention may be prepared by the following method including:

mixing alumina nanopowder and a solvent to prepare an alumina nanopowder suspension; and dispersing the suspension with a bead mill to prepare an alumina nanosol, wherein the alumina nanosol includes a γ-alumina phase in an amount of 99% of more.

The dispersion may be performed by dispersing the solvent and the alumina nanopowder with a bead mill using a spray-type nozzle rotating at a high speed.

In this case, the dispersion of the suspension with the bead mill may be performed at a rotation speed of the center of 3,000 rpm (line speed of 10 m/s) or more. Also, a slurry input rate during the dispersion may be 600 cc/min, and the dispersion may be performed using a composition including 10 L of a dispersion solution. In the case that the rotation speed is less than the above value, dispersibility may decrease, and in the case in which the slurry input rate is greater than the above value, beads may be discharged. A diameter of the beads in the bead mill may be in a range of 0.05 mm to 0.1 mm.

In the method of preparing an alumina nanosol, it is desirable to use the solvent having a low by so as to satisfy fast drying conditions during the preparation of the alumina nanosol. Typical examples of the solvent may be organic solvents such as 1-methoxy-2-propanol, ethyl alcohol, methyl alcohol, or isopropyl alcohol.

The solvent may be included in an amount of 70 wt % to 99 wt % based on a total amount of the alumina nanosol. In the case that the amount of the solvent is greater than 99 wt %, processing time may be increased, and in the case in which the amount of the solvent is less than 70 wt %, since the concentration of Al is excessively high, an unstable coating layer may be formed.

The alumina nanopowder is γ-alumina nanopowder having a particle diameter of 1 nm to 50 nm, wherein the surface charge may be positive (+) and the alumina nanopowder may have low crystallinity.

Also, the prepared alumina nanosol may include alumina nanopowder having a particle diameter of 1 nm to 20 nm.

Thus, in the present invention, a γ-alumina coating layer having low surface roughness, excellent coating performance, and excellent lithium ion mobility may be formed on a portion of the surface of the positive electrode material by employing a semi-dry coating method using a γ-alumina nanosol.

That is, with respect to a method of preparing a positive electrode material including an alumina coating layer using a typical dry mixing method, a phenomenon may not only occur in which dust is generated during a mixing process, but also a uniform coating layer may not be formed because the surface of the positive electrode material is damaged by the dry mixing process. Also, with respect to a method of forming an alumina coating layer using a typical wet mixing method in which the alumina coating layer is prepared by oxidizing aluminum using a solvent such as alkoxide, since the alumina coating layer is partially present as a boehmite phase having low crystallinity, the alumina coating layer having low coating performance may be formed on the entire surface of the positive electrode material. In addition, since uniform coating may be difficult, the absorption and release of lithium ions may be affected.

In contrast, with respect to the semi-dry coating method using a γ-alumina nanosol of the present invention, since γ-alumina particles have very fine pores, high porosity, and a large specific surface area, the semi-dry coating method may improve coating effect by improving adsorption performance of the coating layer. Thus, different from a conventional case, the coating layer may have physical properties of being closely attached to a portion of the surfaces of the positive electrode material particles even if high-temperature sintering is not performed. Also, the γ-alumina coating layer formed on the portion of the surface of the positive electrode material of the present invention does not cover the entire surface of the positive electrode material, but is formed on the portion of the surface. Thus, since the alumina coating layer does not affect the oxidation-reduction reaction of lithium ions, mobility of lithium ions may be excellent. Therefore, capacity of the lithium secondary battery may be increased and cycle life characteristics at high temperature and high voltage may be secured.

In particular, since the γ-alumina coating layer formed on the portion of the surface of the positive electrode material of the present invention does not include a boehmite phase, the γ-alumina coating layer may selectively react with HF generated due to moisture included in a non-aqueous electrolyte solution to act as a scavenger as illustrated in the following Reaction Formula. Thus, compared with a typical alumina coating layer including a boehmite phase, the γ-alumina coating layer may exhibit excellent battery performance in terms of life, cycle, and output characteristics at room temperature and high temperature by preventing the damage to the surface of the positive electrode material and significantly improving the degradation of battery characteristics due to the remaining moisture included in the electrolyte solution (see Reaction Formula below).

$$Al_2O_3 + HF \rightarrow AlF_3 + H_2O \qquad \text{[Reaction Formula]}$$

Also, according to an embodiment of the present invention, there is provided a positive electrode material for a secondary battery including:

lithium transition metal oxide particles represented by Chemical Formula 1; and an alumina coating layer formed on surfaces of the lithium transition metal oxide particles and including a γ-alumina phase in an amount of 95% or more, wherein a coverage of the alumina coating layer is in a range of 30% to 50% based on a total surface area of the lithium transition metal oxide particles, $$Li_{(1+a)}(Ni_{(1-a-b-c)}Mn_bCo_c)O_n \qquad \text{[Chemical Formula 1]}$$

where $0 \leq a \leq 0.1$, $0 \leq b \leq 1$, $0 < c \leq 1$, and n is an integer of 2 or 4.

With respect to the positive electrode material of the present invention, the alumina coating layer does not cover the entire surface of the positive electrode material, but is partially coated on 30% to 50% of the entire surface area of the lithium transition metal oxide particles. Thus, since the alumina coating layer does not affect the absorption and release of lithium ions, excellent mobility of lithium ions may be obtained. In the case that the coverage is greater than 50%, the absorption and release of lithium ions may be affected, and in the case in which the coverage is less than 30%, since the coating area may be small, the number of cycles may be reduced due to a side reaction with the electrolyte solution.

In this case, the alumina coating layer is not concentrated on one side of the surface of the positive electrode material, but the alumina coating layer in the form of particles may be uniformly distributed (coated) on a portion of the surface of the positive electrode material.

Also, the alumina coating layer formed on the portion of the surface of the positive electrode material may have a monolayer or multilayer structure. In this case, a thickness of the alumina coating layer may be appropriately adjusted within a range for increasing life characteristics and high-temperature storage characteristics of the battery and is not particularly limited. However, in the case that the alumina coating layer is excessively thick, since the alumina coating layer may affect capacity and output characteristics, the thickness of the alumina coating layer may be 30 nm or less, for example, 20 nm or less.

Furthermore, the alumina coating layer formed on the portion of the surface of the positive electrode material may have a surface roughness (Ra) of 10 nm or less over the entire surface.

In the present invention, aluminum in the alumina coating layer may be included in an amount of 5 ppm to 100 ppm based on the total weight of the positive electrode material. In the case that the amount of the aluminum is less than 5 ppm, since the amount of the aluminum used in surface coating is small, there may be difficulty in sufficiently forming the coating layer on the surface of the positive electrode material. In contrast, in the case in which the amount of the aluminum is greater than 100 ppm, since a thick coating layer is formed to decrease the mobility of lithium ions, resistance may increase and output characteristics may be affected.

Also, according to an embodiment of the present invention, there is provided a positive electrode for a second battery including a positive electrode material and selectively, at least one additive of a conductive agent, a binder, and a filler, wherein the positive electrode material includes lithium transition metal oxide particles represented by Chemical Formula 1; and an alumina coating layer formed on surfaces of the lithium transition metal oxide particles and including a γ-alumina phase in an amount of 95% or more, in which a coverage of the alumina coating layer is in a range of 30% to 50% based on a total surface area of the lithium transition metal oxide particles.

In this case, the conductive agent is commonly added in an amount of 1 wt % to 30 wt % based on a total weight of a mixture including the positive electrode material.

Any conductive agent may be used without particular limitation so long as it has suitable conductivity without causing adverse chemical changes in the batteries. For example, the conductive agent may include a conductive material such as: graphite, carbon black, acetylene black, Ketjen black, channel black, furnace black, lamp black, thermal black, or conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. Specific examples of a commercial conductive agent may include acetylene black-based products (Chevron Chemical Company, Denka black (Denka Singapore Private Limited), or Gulf Oil Company, Ketjen black, ethylene carbonate (EC)-based products (Armak Company), Vulcan XC-72 (Cabot Company), and Super P (Timcal Graphite & Carbon).

The binder is a component that assists in the binding between an active material and the conductive agent and in the binding with a current collector. The binder is commonly added in an amount of 1 wt % to 30 wt % based on the total weight of the mixture including the positive electrode material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene butadiene rubber, a fluoro rubber, various copolymers, and the like.

The filler is a component selectively used to inhibit expansion of an electrode. There is no particular limit to the filler, so long as it does not cause adverse chemical changes in the batteries and is a fibrous material. Examples of the filler may include olefin-based polymers such as polyethylene and polypropylene; and fibrous materials such as glass fibers and carbon fibers.

The present invention provides a positive electrode for a secondary battery prepared by coating a positive electrode current collector with a slurry, which is prepared by mixing the positive electrode material with a solvent such as N-methyl-2-pyrrolidone (NMP), and then drying and rolling the coated positive electrode current collector.

The positive electrode current collector is generally fabricated to have a thickness of about 3 μm to about 500 μm. The positive electrode current collector is not particularly limited so long as it has high conductivity without causing adverse chemical changes in the batteries. The positive electrode current collector may be formed of, for example, stainless steel, aluminum, nickel, titanium, fired carbon, or aluminum or stainless steel that is surface-treated with one of carbon, nickel, titanium, silver, or the like. The collector may have an uneven surface to improve the bonding strength of a positive electrode active material and may have any of various shapes such as that of a film, a sheet, a foil, a net, a porous body, a foam body, a non-woven fabric body, and the like.

Also, according to an embodiment of the present invention, there is provided a lithium secondary battery including a positive electrode, a negative electrode, a separator disposed between the positive electrode and the negative electrode, and an electrolyte solution, wherein the positive electrode includes a positive electrode material represented by Chemical Formula 2,

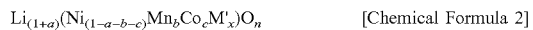

$$Li_{(1+a)}(Ni_{(1-a-b-c)}Mn_bCo_cM'_x)O_n$$ [Chemical Formula 2]

where $0 \leq a \leq 0.1$, $0 \leq b \leq 1$, $0 < c \leq 1$, $0 < x \leq 1$, n is an integer of 2 or 4, and M' is $Al_2O_3$ having a gamma phase.

In this case, the lithium secondary battery may have an HF content of 900 ppm or less based on a total weight of the electrolyte solution after an activation process and initial charge and discharge.

Also, the lithium secondary battery may have an HF content of 100 ppm or less based on the total weight of the electrolyte solution after 10 charge and discharge cycles.

In the lithium secondary battery of the present invention, the γ-alumina coating layer coated on the surface of the positive electrode material may selectively react with HF generated due to moisture included in the non-aqueous electrolyte solution to act as a scavenger. For example, after a predetermined amount (5,000 ppm) of moisture is added to the electrolyte solution of the lithium secondary battery and positive electrode powders before and after $Al_2O_3$ coating were added, if the HF content is measured after one week, the HF content is 5,000 ppm with respect to the secondary battery using the positive electrode powder on which a coating layer is not formed, but it may be understood that the HF content is decreased to less than 1,000 ppm, particularly, 900 ppm or less with respect to the secondary battery using the positive electrode powder coated with $Al_2O_3$.

In the lithium secondary battery, the negative electrode is prepared by coating a negative electrode current collector with a negative electrode material including a negative electrode active material and then drying the negative electrode current collector. If necessary, components, such as a conductive agent, a binder, and a filler, may be included in the negative electrode material.

Examples of the negative electrode active material may include carbon and graphite materials such as natural graphite, artificial graphite, expanded graphite, carbon fibers, hard carbon, carbon black, carbon nanotubes, fullerenes and activated carbon; metals, such as Al, silicon (Si), tin (Sn), silver (Ag), bismuth (Bi), Mg, zinc (Zn), indium (In), germanium (Ge), lead (Pb), palladium (Pd), platinum (Pt), and Ti, which are alloyable with lithium, and compounds containing these elements; composites of carbon and graphite materials with a metal and a compound thereof; and lithium-containing nitrides. Among them, a carbon-based active material, a silicon-based active material, a tin-based active material or a silicon-carbon-based active material may be used, and these materials may be used alone or in combination of two or more thereof.

The negative electrode current collector is generally fabricated to have a thickness of about 3 μm to about 500 μm. The negative electrode current collector is not particularly limited so long as it has conductivity without causing adverse chemical changes in the batteries. The negative electrode current collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the positive electrode current collector, the negative electrode current collector may have a fine roughness surface to improve bonding strength with a negative electrode active material. The negative electrode current collector may have various shapes such as a film, a sheet, a foil, a net, a porous body, a foam body, a non-woven fabric body, and the like.

The separator is disposed between the positive electrode and the negative electrode, and a thin insulating film having high ion permeability and mechanical strength is used. The separator typically has a pore diameter of 0.01 μm to 10 μm and a thickness of 5 μm to 300 μm. For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

The lithium salt-containing non-aqueous electrolyte solution is formed of an electrolyte and a lithium salt, and an organic solid electrolyte and an inorganic solid electrolyte in addition to a non-aqueous organic solvent may be used as the electrolyte solution.

Examples of the non-aqueous organic solvent may include aprotic organic solvents, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may include a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

Examples of the inorganic solid electrolyte may include nitrides, halides, and sulfates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and for example, may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the electrolyte solution. In some cases, halogen-containing solvents, such as carbon tetrachloride and ethylene trifluoride, may be further included in order to impart incombustibility, carbon dioxide gas may be further included in order to improve high-temperature storage characteristics, and fluoro-ethylene carbonate (FEC) and propene sultone (PRS) may be further included.

The secondary battery may not only be used in a battery cell used as a power source of a small device, but may also be used as a unit cell in a medium and large sized battery module including a plurality of battery cells which is used as a power source of a medium and large sized device requiring high-temperature stability, cycle life characteristics, and high rate capability.

Preferred examples of the medium and large sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; and a power storage device, which move by the power of an electric motor, but the medium and large sized device is not limited thereto.

Although the invention has been shown and described with reference to exemplary embodiments thereof, it will be understood that various modifications may be made therein without departing from the spirit and scope of the invention. Therefore, the scope of the present invention should not be limited to the above-described embodiments but should be determined by not only the appended claims but also the equivalents thereof.

EXAMPLES

Preparation Example 1: Preparation of Alumina Nanosol 1,000 g of γ-alumina powder (Alu-C, size $D_{50}$) and 9,000 g of 1-methoxy-2-propanol were mixed and then dispersed with a vertical bead mill (Apex mill) to prepare a γ-alumina nanosol including γ-alumina nanopowder having a particle diameter of 10 nm. The alumina nanosol was dried and X-ray diffraction (XRD) measurement was performed (see FIG. 1).

Example 1: Preparation of Positive Electrode Material Containing γ-Alumina Coating Layer (Low-Temperature Drying)

48.25 g of $Li_2CO_3$ and 101.75 g of $Co_3O_4$ were put in a powder mixer and mixed for 5 minutes. Then, sintering was performed at a temperature of 1,000° C. for 10 hours in a sintering furnace. A cake obtained after the sintering was put in a grinder and ground to a diameter of 18 μm to prepare a lithium transition metal oxide ($LiCoO_2$).

Figure 2:
FIG. 2 is a scanning electron microscope (SEM) image of a surface of a positive electrode material prepared according to Example 1 of the present invention.

Next, the alumina nanosol of Preparation Example 1 and the lithium transition metal oxide were put in a multi-purpose device (MP5) and mixed to prepare a positive electrode material including a γ-alumina coating layer. Then, the positive electrode material was dried at a temperature of 200° C. for 10 hours. FIG. 2 is an electron microscope (SEM) image of the surface of the prepared positive electrode material.

Example 2: Preparation of Positive Electrode Material Containing γ-Alumina Coating Layer (High-Temperature Sintering)

Figure 3:
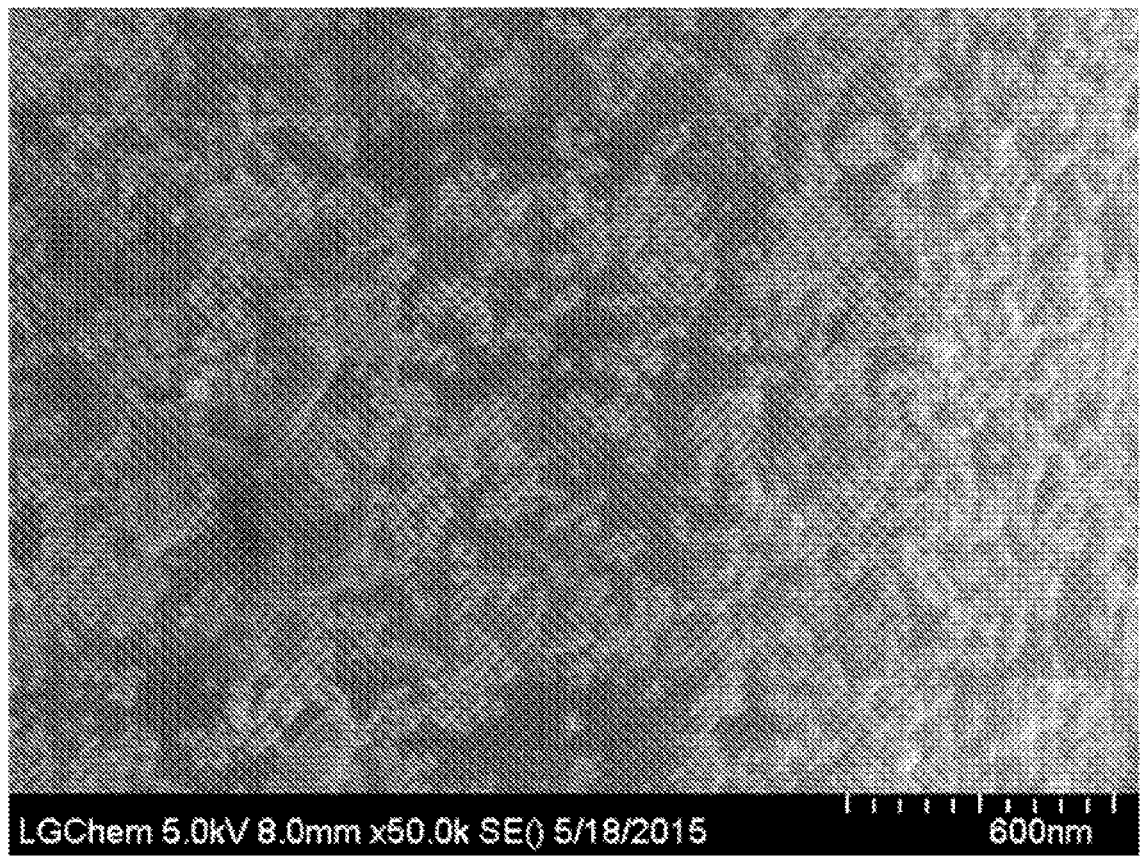
FIG. 3 is an SEM image of a surface of a positive electrode material prepared according to Example 2 of the present invention.

A positive electrode material was prepared in the same manner as in Example 1 except that the positive electrode material prepared in Example 1 was further sintered at a temperature of about 500° C. for 10 hours. FIG. 3 is an electron microscope (SEM) image of the surface of the prepared positive electrode material.

Example 3: Secondary Battery Preparation

The positive electrode material having an alumina coating layer formed thereon prepared in Example 1, a conductive agent, and a binder were mixed at a weight ratio of 96:2:2 to prepare a positive electrode slurry. An Al foil was coated with the slurry and then rolled and dried to prepare a positive electrode for a secondary battery. The positive electrode was punched into a coin shape and a coin-type secondary battery was then prepared.

Li metal was used as a negative electrode active material of the secondary battery, and an electrolyte solution was used in which 1 M $LiPF_6$ was dissolved in a carbonate electrolyte solution.

Example 4: Secondary Battery Preparation

The positive electrode material having an alumina coating layer formed thereon prepared in Example 2, a conductive agent, and a binder were mixed at a weight ratio of 96:2:2 to prepare a positive electrode slurry. An Al foil was coated with the slurry and then rolled and dried to prepare a positive electrode for a secondary battery. The positive electrode was punched into a coin shape and a coin-type secondary battery was then prepared.

Li metal was used as a negative electrode active material of the secondary battery, and an electrolyte solution was used in which 1 M $LiPF_6$ was dissolved in a carbonate electrolyte solution.

Comparative Example 1: Positive Electrode Material Having Alumina Coating Layer Including Boehmite Phase Formed Thereon (Low-Temperature Sintering)

An alumina solution was prepared by oxidizing aluminum (Al) using a solvent such as alkoxide, and a positive electrode material having an alumina coating layer formed thereon was then prepared by mixing as well as dispersing a predetermined amount of positive electrode material powder ($LiCoO_2$) in the alumina solution.

Figure 4:
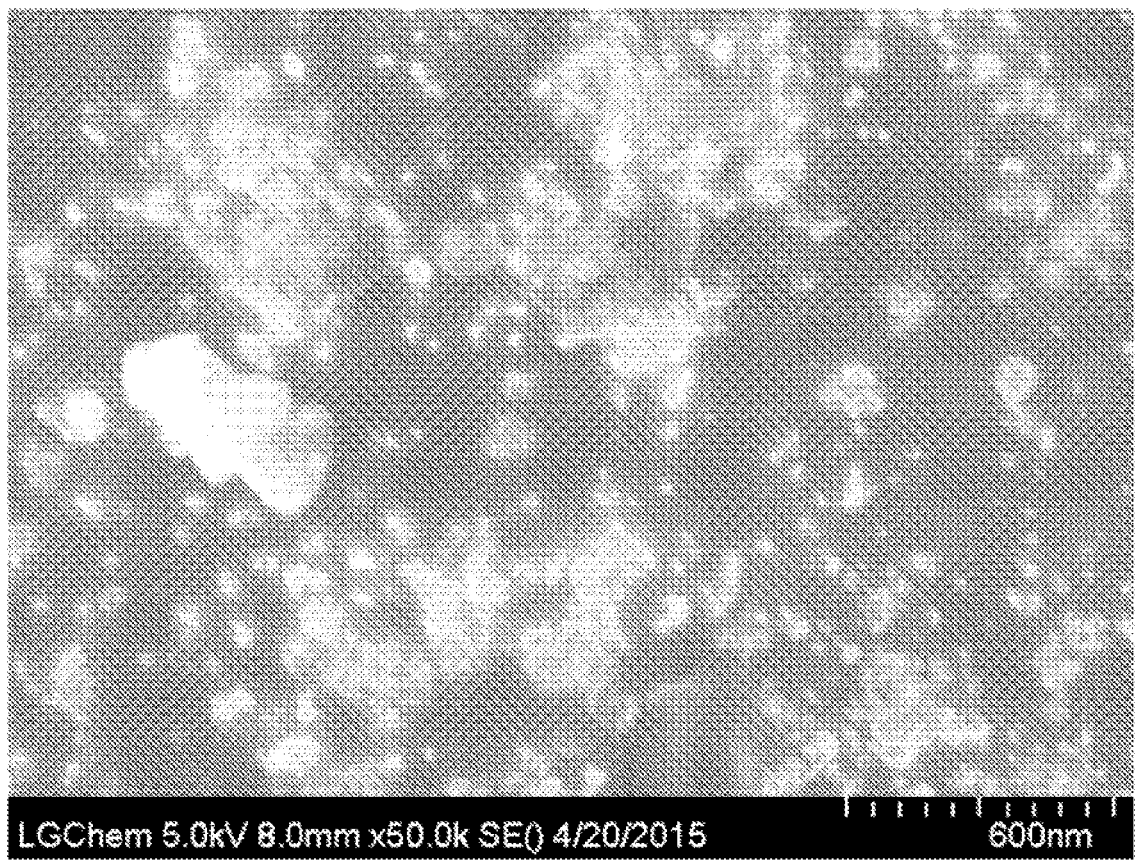
FIG. 4 is an SEM image of a surface of a positive electrode material prepared according to Comparative Example 1.

Next, the prepared positive electrode powder was dried at a temperature of 200° C. for 10 hours. FIG. 4 is an electron microscope (SEM) image of the surface of the prepared positive electrode material.

Comparative Example 2: Preparation of Positive Electrode Material Having Alumina Coating Layer Including Boehmite Phase Formed Thereon (High-Temperature Sintering)

Figure 5:
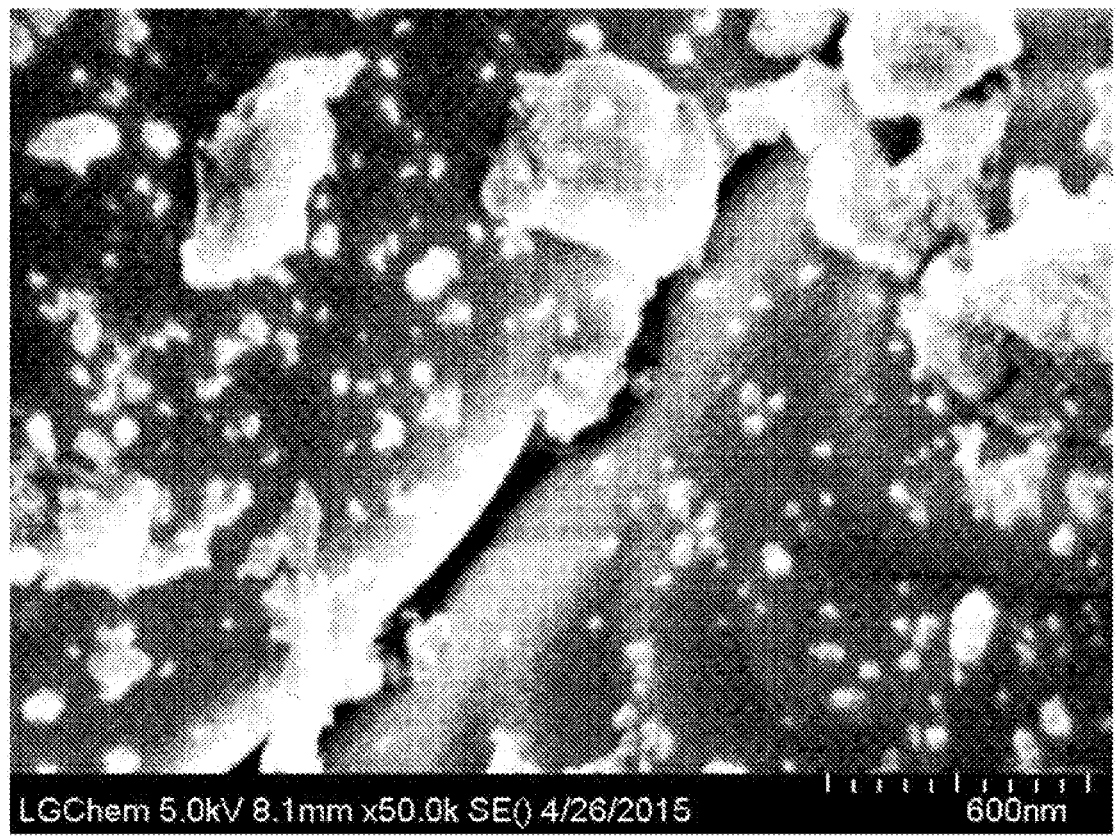
FIG. 5 is an SEM image of a surface of a positive electrode material prepared according to Comparative Example 2.

A positive electrode material was prepared in the same manner as in Comparative Example 1 except that the positive electrode material prepared in Comparative Example 1 was further sintered at a temperature of about 500° C. for 10 hours. FIG. 5 is an electron microscope (SEM) image of the surface of the prepared positive electrode material.

Comparative Example 3: Secondary Battery Preparation

The positive electrode material having an alumina coating layer formed thereon prepared in Comparative Example 1, a conductive agent, and a binder were mixed at a weight ratio of 96:2:2 to prepare a positive electrode slurry. An Al foil was coated with the slurry and then rolled and dried to prepare a positive electrode for a secondary battery. The positive electrode was punched into a coin shape and a coin-type secondary battery was then prepared. Li metal was used as a negative electrode active material, and an electrolyte solution was used in which 1 M $LiPF_6$ was dissolved in a carbonate electrolyte solution.

Comparative Example 4: Secondary Battery Preparation

The positive electrode material having an alumina coating layer formed thereon prepared in Comparative Example 2, a conductive agent, and a binder were mixed at a weight ratio of 96:2:2 to prepare a positive electrode slurry. An Al foil was coated with the slurry and then rolled and dried to prepare a positive electrode for a secondary battery. The positive electrode was punched into a coin shape and a coin-type secondary battery was then prepared. Li metal was used as a negative electrode active material, and an electrolyte solution was used in which 1 M $LiPF_6$ was dissolved in a carbonate electrolyte solution.

Experimental Example 1. Surface Morphology Observation

A surface of each positive electrode material prepared in Examples 1 and 2 and Comparative Examples 1 and 2 was observed with an electron microscope to measure a coverage of each alumina coating layer.

According to the measurement results, it may be confirmed that alumina coating layers having a coverage of about 30% to about 50% were respectively formed on the surfaces of the positive electrode materials of Examples 1 and 2, but alumina coating layers in film shapes were respectively formed on the entire surfaces of the positive electrode materials of Comparative Examples 1 and 2.

In this case, surface roughness (Ra) of the surfaces of the positive electrode materials of Examples 1 and 2 was 10 nm (see FIGS. 2 and 3), but since the positive electrode materials of Comparative Examples 1 and 2 subjected to low-temperature sintering had poor dispersibility so that large particles were present, it may be confirmed that coating performance was low, for example, surface roughness (Ra) of the surfaces of the positive electrode materials of Comparative Examples 1 and 2 was 100 nm (see FIGS. 4 and 5).

Experimental Example 2. Comparison of Scavenger Effect

The electrolyte solutions of the secondary batteries of Examples 3 and 4 and Comparative Examples 3 and 4 were exposed to the outside air to generate HF so that lithium secondary batteries were prepared in which an HF content was 10,500 ppm (amount of moisture of 10,000 ppm) based on the total weight of the electrolyte solution. Subsequently, the positive electrode materials prepared in Examples 1 and 2 were added to 100 g of each electrolyte solution in which the amount of moisture was maintained at a level of 10,000 ppm, and the HF content (concentration) remained in the electrolyte was measured after a predetermined time has passed. The results thereof are presented in Table 1.

In this case, the HF content was measured using a Metrohm 848/801 instrument, a pH level was identified by titrating an acid (HF) in the electrolyte solution with a basic solution, and thus, the concentration of HF may be evaluated.

TABLE 1

| HF content | HF content in initial electrolyte solution | HF content after storing 1 week | HF content after storing 2 weeks | HF content after storing 3 weeks |
|---|---|---|---|---|
| Example 3 | 10,500 ppm | 890 ppm | 770 ppm | 650 ppm |
| Example 4 | 10,500 ppm | 850 ppm | 760 ppm | 666 ppm |
| Comparative Example 3 | 10,500 ppm | 8,010 ppm | 7,500 ppm | 7,000 ppm |
| Comparative Example 4 | 10,500 ppm | 5,100 ppm | 4,510 ppm | 4,320 ppm |

As illustrated in Table 1, with respect to the secondary batteries of Comparative Examples 3 and 4, it may be understood that the reduction rate of the HF content in the electrolyte solution significantly decreased with time in comparison to that of Examples 3 and 4. As a result, it may be confirmed that the γ-alumina coating layer formed on the portion of the positive electrode material of the present invention acted as an HF scavenger.

Experimental Example 3

Figure 6:
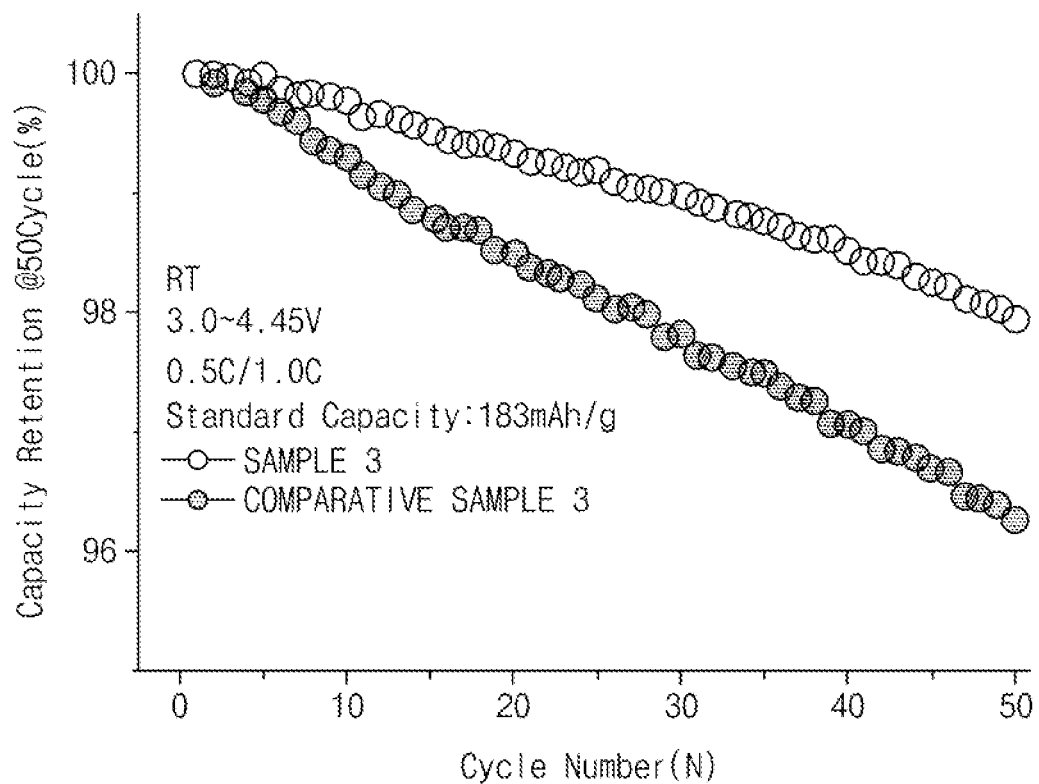
FIG. 6 is a graph comparing cycle life characteristics of secondary batteries of Example 3 and Comparative Example 3 according to Experimental Example 3 of the present invention.
Figure 7:
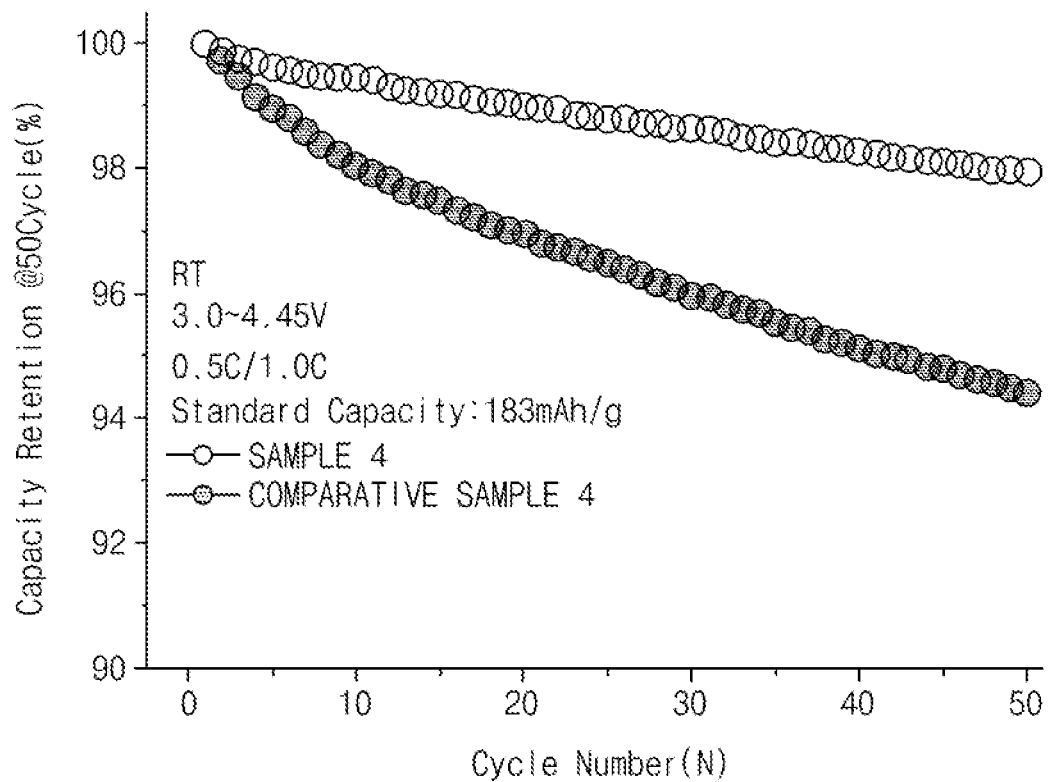
FIG. 7 is a graph comparing cycle life characteristics of secondary batteries of Example 4 and Comparative Example 4 according to Experimental Example 3 of the present invention.

Cycle life tests were performed on the secondary batteries prepared in Example 4 and Comparative Example 4, and the results thereof are presented in FIGS. 6 and 7. Specifically, capacity change test was performed for 50 cycles at 0.5 C/1 C and a voltage of 4.45 V at 45° C.

Referring to FIGS. 6 and 7, with respect to the secondary battery of Example 4 based on 50 cycles, it may be confirmed that the reduction of capacity and cycle characteristics was improved in comparison to the secondary battery of Comparative Example 4. That is, it may be confirmed that the secondary batteries of the present invention did not have a big difference in the changes of capacity according to cycle, but, with respect to the secondary batteries of the comparative examples, cycle life characteristics were significantly reduced because the positive electrode material included insufficiently acted as an HF scavenger.

The invention claimed is:

1. A method of preparing a positive electrode material for a lithium secondary battery, the method comprising steps of:
   a first step of synthesizing a lithium transition metal oxide represented by Chemical Formula 1;
   a second step of preparing lithium transition metal oxide powder by grinding the lithium transition metal oxide so that a particle diameter of the lithium transition metal oxide powder is in a range of 10 μm to 30 μm after the grinding;
   a third step of preparing a positive electrode material including an alumina coating layer by mixing as well as dispersing the lithium transition metal oxide powder in an alumina nanosol, wherein the alumina nanosol is prepared by a method including: mixing alumina nanopowder and a solvent to prepare an alumina nanopowder suspension; and dispersing the suspension to prepare the alumina nanosol, wherein the alumina nanosol includes a γ-alumina phase in an amount of 99% or more;
   wherein the lithium transition metal oxide powder and the alumina nanosol are mixed in a weight ratio of 1:80 to 1:100;
   wherein the lithium transition metal oxide powder is dispersed in the alumina nanosol is after a lithium transition metal oxide powder solution is prepared by spraying the lithium transition metal oxide powder in an organic solvent;
   a fourth step of drying the positive electrode material in a temperature range of 100° C. to 350° C.,
   a fifth step of sintering the positive electrode material in a temperature range of 400° C. to 1200° C., after the drying in the fourth step; and $$Li_{(1+a)}(Ni_{(1-a-b-c)}Mn_bCo_c)O_n \qquad \text{[Chemical Formula 1]}$$

where 0≤a≤0.1, 0≤b≤1, 0<c≤1, a+b+c≤1, and n is an integer of 2 or 4.

2. The method of claim 1, wherein the alumina coating layer comprises the γ-alumina phase in an amount of 95 wt % or more based on a total weight of the alumina coating layer.

3. The method of claim 1, wherein the lithium transition metal oxide is $Li(Ni_{0.6}Mn_{0.2}Co_{0.2}O_2)$, $Li(Ni_{0.8}Mn_{0.1}Co_{0.1}O_2)$, $Li(Ni_{0.5}Mn_{0.3}Co_{0.2}O_2)$, $Li(Ni_{1/3}Mn_{1/3}Co_{1/3}O_2)$, or $LiCoO_2$.

4. The method of claim 1, wherein the organic solvent is 1-methoxy-2-propanol, ethyl alcohol, methyl alcohol, or isopropyl alcohol.

5. The method of claim 1, wherein the organic solvent is used in an amount of 70 wt % to 99 wt % based on a total weight of the positive electrode material.

* * * * *